United States Patent
Zhou

(10) Patent No.: US 11,394,495 B2
(45) Date of Patent: Jul. 19, 2022

(54) HYBRID AUTOMATIC REPEAT REQUEST (HARQ) FEEDBACK METHOD AND DEVICE AND DATA RECEIVING APPARATUS

(71) Applicant: BEIJING XIAOMI MOBILE SOFTWARE CO., LTD., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 42 days.

(21) Appl. No.: 16/955,691

(22) PCT Filed: Dec. 29, 2017

(86) PCT No.: PCT/CN2017/119970
§ 371 (c)(1),
(2) Date: Jun. 18, 2020

(87) PCT Pub. No.: WO2019/127415
PCT Pub. Date: Jul. 4, 2019

(65) Prior Publication Data
US 2020/0313811 A1 Oct. 1, 2020

(51) Int. Cl.
*H04L 1/18* (2006.01)

(52) U.S. Cl.
CPC .......... *H04L 1/1816* (2013.01); *H04L 1/1861* (2013.01)

(58) Field of Classification Search
CPC ... H04W 28/04; H04W 72/04; H04W 72/042; H04W 88/08; H04L 1/1816
(Continued)

(56) References Cited

U.S. PATENT DOCUMENTS

2016/0165591 A1* 6/2016 Li ..................... H04W 72/0413
370/280
2018/0278373 A1* 9/2018 Wang .................... H04L 1/1812
(Continued)

FOREIGN PATENT DOCUMENTS

CN 107113110 A * 8/2017 ........... H04L 1/1812
CN 107113110 A * 10/2017 .......... H04W 72/042
(Continued)

OTHER PUBLICATIONS

3GPP TSG RAN WG1 NR Ad-Hoc #12, Qingdao, P.R. China, Jun. 27-30, 2017, R1-1710242, Agenda item: 5.1.3.3.5.2, Source: Fujistu, Title: Discussion on HARQ-ACK Codebook. (Year: 2017).*
(Continued)

*Primary Examiner* — Peter G Solinsky
*Assistant Examiner* — Sanjay K Dewan
(74) *Attorney, Agent, or Firm* — Arch & Lake LLP

(57) ABSTRACT

The present disclosure relates to a HARQ feedback method and device, and a method and device for determining data to be retransmitted. The HARQ feedback method includes: grouping component carriers (CCs) according to a binding rule which includes a number of resource units in the CCs that can be bundled into a group; calculating a parameter value of each CC group; generating the same number of HARQ codebooks as that of CC groups, a length of one of the HARQ codebooks being determined by a parameter value of a corresponding CC group and the maximum number of resource units in a single CC in the corresponding CC group; and feeding the HARQ codebooks back to a data sender.

14 Claims, 13 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0149271 A1* | 5/2019 | Yin | ....................... | H04L 1/1816 370/329 |
| 2019/0149275 A1* | 5/2019 | He | ....................... | H04L 1/1819 370/329 |
| 2019/0150181 A1* | 5/2019 | Kim | ...................... | H04L 1/1858 370/329 |
| 2019/0215128 A1* | 7/2019 | Zhang | ..................... | H04L 5/001 |
| 2020/0374045 A1* | 11/2020 | Yin | ...................... | H04B 7/0456 |
| 2021/0014004 A1* | 1/2021 | Khoshnevisan | ...... | H04L 1/1664 |

FOREIGN PATENT DOCUMENTS

| | | | | |
|---|---|---|---|---|
| CN | 107295664 A | | 10/2017 | |
| CN | 107359969 A | * | 11/2017 | ........... H04L 1/1607 |
| CN | 107404712 A | * | 11/2017 | .............. H04W 4/06 |

OTHER PUBLICATIONS

3GPP TSG RAN WG1 #91, Reno, Nevada, USA, Nov. 27-Dec. 1, 2017, R1-1720096, Source: Intel Corporation, Title : On remaining aspects of CBG-based (re)transmission, Agenda item: 7.3.3.3. (Year: 2017).*

3GPP TSG RAN WG1 Meeting #90bis, Prague, Czech Republic, Oct. 9-13, 2017, R1-1718645, Agenda item: 7.3.3.2, Source: Ericsson, Title: On HARQ Management. (Year: 2017).*

3GPP TSG RAN WG1 Meeting #90, Prague, Czechia, Aug. 21-25, 2017, R1-1713194, Agenda item: 6.1.3.3.5.2, Source: LG Electronics, Title: Support on HARQ-ACK multiplexing/bundling for NR. (Year: 2017).*

3GPP TSG RAN WG1 Meeting #90, Prague, Czech Republic, Aug. 21-25, 2017, R1-1712746, Agenda item: 6.1.3.3.5.2, Source: Fujitsu, Title: Discussion on HARQ ACK Codebook. (Year: 2017).*

International Search Report to PCT Application No. PCT/CN2017/119970 dated Aug. 30, 2018 with English translation, (4p).

Fujitsu, "Discussion on HARQ-ACK Codebook" 3GPP TSG RAN WG1 Meeting #90 R1-1712746, Aug. 25, 2017, Prague, Czech Republic, (3p).

Intel Corporation, "On Remaining Aspects of CBG-based (Re) Transmission" 3GPP TSG RAN WG1 #91 R1-1720096, Dec. 1, 2017, Reno, Nevada, (4p).

Fujitsu, "Discussion on HARQ-ACK Codebook" 3GPP TSG RAN WG1 NR Ad-Hoc#2 R1-1710242, Jun. 30, 2017, Qingdao, China, (4p).

First Office Action of the Chinese Application No. 201780002370.0, dated Nov. 4, 2020 with English translation, (19p).

International Search Report and Written Opinion in the International Application No. PCT/CN2017/119970, dated Aug. 30, 2018, (6p).

Fujitsu, "Discussion on HARQ-ACK Codebook" 3GPP TSG RAN WG1 Meeting #90 R1-1712746, Prague Czech Republic, Aug. 25, 2017, (4p).

Intel Corporation, "On Remaining Aspects of CBG-based (Re)Transmission" 3GPP TSG-RAN WG1 #91 R1-1720096, Reno, Nevada, Dec. 1, 2017, (4p).

Fujitsu, "Discussion on HARQ-ACK Codebook" 3GPP TSG RAN WG1 NR Ad-Hoc#2 R1-1710242, Qingdao, PRC, Jun. 30, 2017, (4p).

Supplementary European Search Report in the European Application No. 17936621.6, dated Jul. 13, 2021, (6p).

Office Action of the Indian Application No. 202047030904, dated Sep. 10, 2021, (6p).

Ericsson: "On HARQ Management", 3GPP TSG RAN1 WG1 Meeting #90bis, R1-1718645, Prague, Czech Republic, Oct. 9-13, 2017 (10p).

LG Electronics: Support of HARQ-ACK Multiplexing/Bundling for NR, 3GPP TSG RAN WG1 Meeting #90, R1-1713194, Prague, Czech Republic, Aug. 21-25, 2017, (9p).

* cited by examiner

HYBRID AUTOMATIC REPEAT REQUEST (HARQ) FEEDBACK METHOD AND DEVICE AND DATA RECEIVING APPARATUS

CROSS-REFERENCE

This Application is a National Stage of International Application No. PCT/CN2017/119509 filed on Dec. 28, 2017, the content of which is incorporated herein by reference in its entirety for all purposes.

TECHNICAL FIELD

The present disclosure generally relates to the technical field of communications, and more particularly, to a hybrid automatic repeat request (HARQ) feedback method and device, a method and device for determining data to be retransmitted, a data receiving apparatus, a data sending apparatus and a computer-readable storage medium.

BACKGROUND

Along with development of communication technologies, 5th Generation (5G) has emerged. Present service types of 5G at least include enhanced Mobile Broad Band (eMBB), massive Machine Type Communication (mMTC), Ultra Reliable Low Latency Communication (URLLC) and other types. All these services are data services but have different requirements on delay and reliability. For example, a URLLC service is applied to the fields of Internet of vehicles and the like requiring low delay, has a very high requirement on timeliness, is required to be timely established and is even preemptive for a previous service. An mMTC service is usually insensitive to delay, and data may be delivered at a relatively long interval. A manner for effectively transmitting a delay-sensitive service is to improve transmission of a HARQ, for example, giving a retransmission feedback faster and more accurately. In 3rd Generation Partnership Project (3GPP) 5G New Radio (NR), a code block group (CBG) rather than a Transmission Block (TB) in Long Term Evolution (LTE) is retransmitted. CBG is a smaller data unit in TB.

For HARQ retransmission of multiple carriers, it is necessary to effectively code and aggregate retransmitted information of multiple component carriers (CCs) to implement unified transmission of retransmitted bits.

There may be such a condition in the future that the number of CBGs in one TB in a CC is different from the one in a different CC. For this condition, a codebook may be fed back for the CCs with the same number of CBGs, so as to reduce waste of feedback bits. However, it is necessary to feed back multiple HARQ codebooks and keep multiple counter downlink assignment indexes (DAIs) and total DAIs. If the number of CBGs in one TB increases to 32 in the future, it is necessary to feed back 32 HARQ codebooks and record the position of each CC in the 32 codebooks, which may increase a signaling overhead. Therefore, how to make a HARQ feedback to reduce the volume of feedback information is a technical problem that needs to be solved.

SUMMARY

The present application provides a HARQ feedback method and device, a method and device for determining data to be retransmitted.

According to a first aspect of embodiments of the present disclosure, a HARQ feedback method may be applied to a data receiver and may include that:

CCs are grouped according to a binding rule, the binding rule including the number of resource units contained in a group of CCs that are capable for being bundled;

a parameter value of each CC group is calculated;

the same number of HARQ codebooks as that of CC groups are generated, a length of one of the HARQ codebooks being determined respectively by the parameter value of a corresponding CC group and a maximum number of resource units contained in a single CC in the corresponding CC group; and the HARQ codebooks are fed back to a data sender.

According to a second aspect of the embodiments of the present disclosure, a method for determining data to be retransmitted may be applied to a data sender and may include that:

a HARQ codebook fed back by a data receiver is received;

the HARQ codebook is parsed to obtain a parameter value of each CC group, the parameter value being determined through calculation by the data receiver after CCs are grouped according to a binding rule and the binding rule including the number of resource units contained in a group of CCs that are capable for being bundled;

CC identifiers sequentially included in each CC group are determined;

feedback bit information corresponding to the resource units is restored according to the parameter value of each CC group and the CC identifiers sequentially included in each CC group; and resource unit information of data to be retransmitted is determined according to the feedback bit information.

According to a third aspect of the embodiments of the present disclosure, a HARQ feedback device may be applied to a data receiver and may include: a processor; and a memory configured to store instructions executable by the processor. The processor may be configured to: group CCs according to a binding rule, the binding rule including the number of resource units contained in a group of CCs that are capable for being bundled; calculate a parameter value of each CC group after the grouping module groups the CCs; generate the same number of HARQ codebooks as that of CC groups after the grouping module groups the CCs, a length of one of the HARQ codebooks being determined respectively by the parameter value of a corresponding CC group and a maximum number of resource units contained in a single CC in the corresponding CC group; and feed back the HARQ codebooks generated by the generation module to a data sender.

According to a fourth aspect of the embodiments of the present disclosure, a device for determining data to be retransmitted may be applied to a data sender and may include: a processor; and a memory configured to store instructions executable by the processor. The processor may be configured to receive a hybrid automatic repeat request (HARQ) codebook fed back by a data receiver; parse the HARQ codebook received to obtain a parameter value of each component carrier (CC) group, wherein the parameter value is determined through calculation by the data receiver after CCs are grouped according to a binding rule and the binding rule comprises a number of resource units contained in a group of CCs and the group of CCs are capable for being bundled; determine CC identifiers sequentially included in each CC group; restore feedback bit information corresponding to the resource units according to the parameter value in each CC group and the CC identifiers, where the parameter value is obtained by parsing and the CC identifiers are determined sequentially included in each CC group; and determine resource unit information of data to be retransmitted according to the feedback bit information restored.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure.

Figure 1:
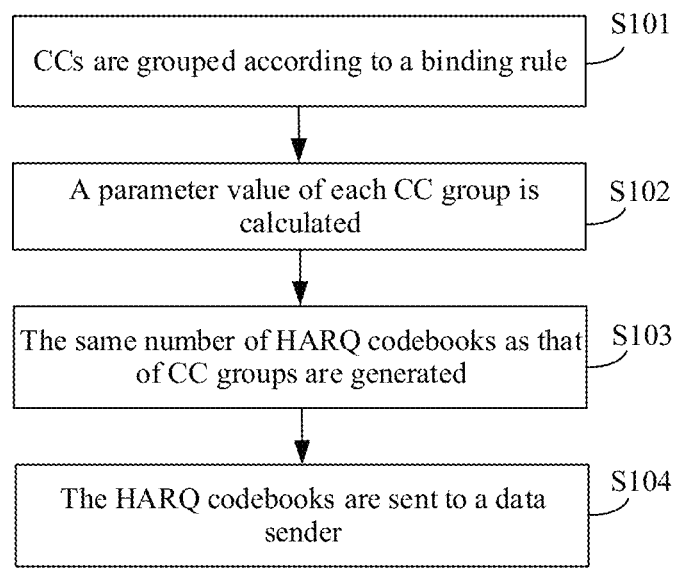
FIG. 1 is a flowchart showing a HARQ feedback method according to an exemplary embodiment of the present application.

FIG. 1 is a flowchart showing a HARQ feedback method according to an exemplary embodiment of the present application. The embodiment is described from the aspect of a data receiver. The data receiver may be a base station or may be UE. As shown in FIG. 1, the HARQ feedback method may include the following steps.

In step S101, CCs are grouped according to a binding rule, the binding rule including the number of resource units contained in a group of CCs that are allowable and capable for being bundled.

The resource units each may include, but not limited to, a CBG. The operation that the CCs are grouped according to the binding rule may include that: the CCs are hierarchically grouped according to the binding rule, the binding rule including a range of the number of resource units contained the hierarchically grouped CCs. For example, a range of amount of resource units, for example, a range of amount of CBGs, in a first-level CC group is 1 to 2, and a range of amount of resource units, for example, a range of amount of CBGs, in a second-level CC group is 3 to 4.

Figure 2:
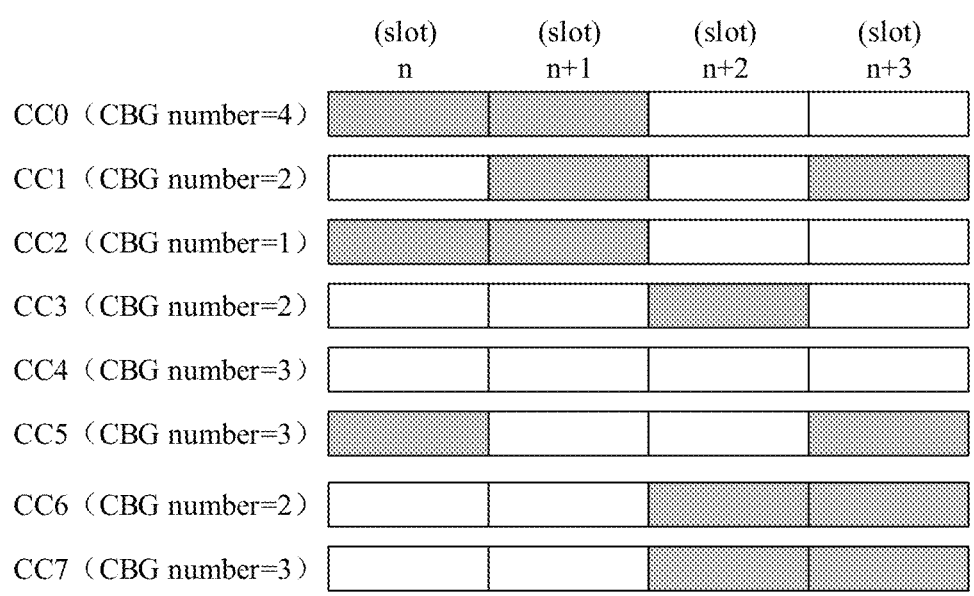
FIG. 2 is a schematic diagram illustrating multiple CCs according to an exemplary embodiment of the present application.
Figure 3:
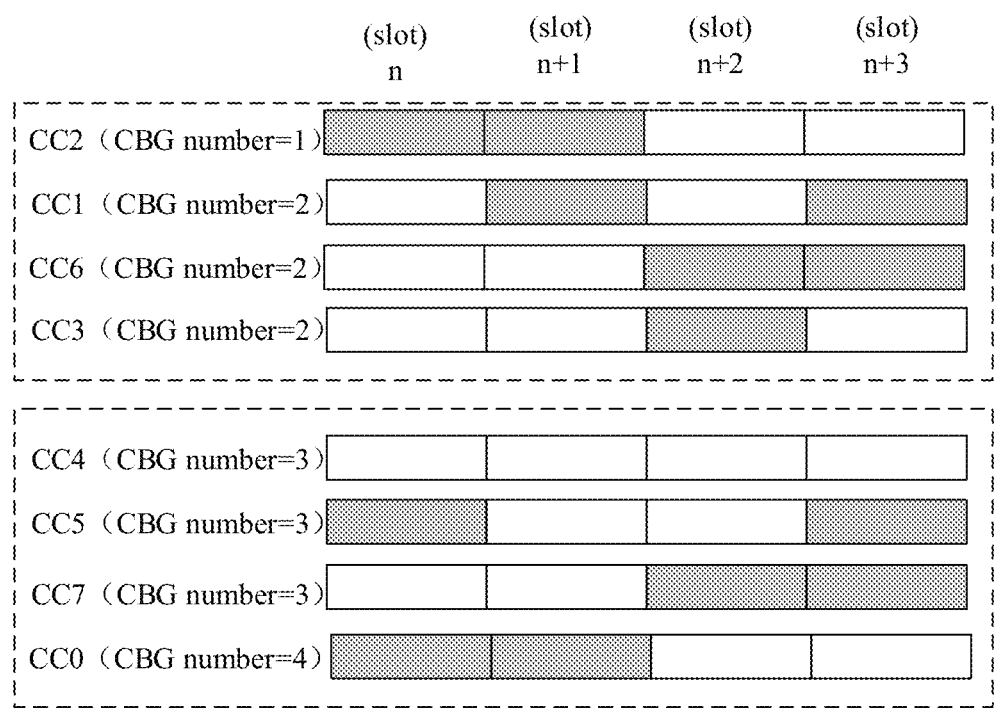
FIG. 3 is a schematic diagram after multiple CCs in FIG. 2 are hierarchically grouped according to an exemplary embodiment of the present application.

A CC grouping process will be described below with 8 CCs as an example. CC0 may include 4 CBGs, CC1 may include 2 CBGs, CC2 may include 1 CBG, CC3 may include 2 CBGs, CC4 may include 3 CBGs, CC5 may include 3 CBGs, CC6 may include 2 CBGs and CC7 may include 3 CBGs, as shown in FIG. 2. In FIG. 2, the grey block represents a slot where data is transmitted. If the binding rule includes that the range of the amount of the CBGs in the first-level CC group is 1 to 2 and the range of the amount of the CBGs in the second-level CC group is 3 to 4, the hierarchically grouped CCs are the ones as shown in FIG. 3.

In step S102, a parameter value of each CC group is calculated.

The parameter value may be a total DAI. For example, a total DAI of a first CC group (or the first-level CC group) in FIG. 3 is calculated to be 7, and a total DAI of a second CC group (or the second-level CC group) in FIG. 3 is calculated to be 6.

In step S103, the same number of HARQ codebooks as that of CC groups are generated, a length of one of the HARQ codebooks being determined by the parameter value of each corresponding CC group and the maximum number of resource units in a single CC in the each corresponding CC group.

For example, as shown in FIG. 3, two HARQ codebooks may be generated, a length of the first codebook may be 7*2=14 bit, and a length of the second codebook may be 6*4=24 bit.

In step S104, the HARQ codebooks are fed back to a data sender.

In the embodiment, the data receiver may combine multiple generated codebooks and feed them back to the data sender.

In addition, the method may further include that: a manner for determining CC identifiers sequentially included in each CC group is agreed with the data sender, or the CC identifiers sequentially included in each CC group are sent to the data sender. It may be agreed that CC identifiers sequentially included in each CC group are determined according to a data receiving sequence or in other manners.

According to the embodiments, CCs may be grouped according to a binding rule, a parameter value of each CC group may be calculated, the same number of HARQ codebooks as that of CC groups may be generated, and then the HARQ codebooks may be fed back to a data sender, so that the volume of feedback information is optimized, and the volume of the feedback information is further reduced.

Figure 4:
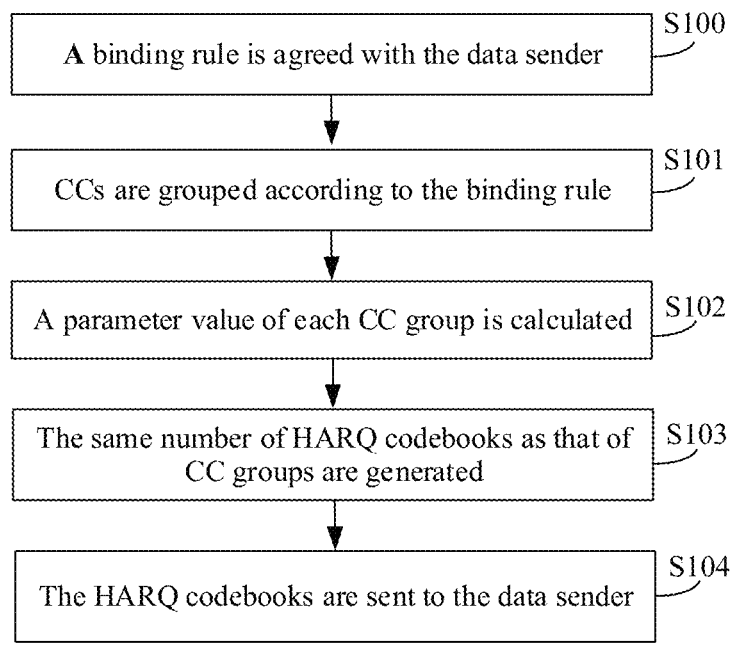
FIG. 4 is a flowchart showing another HARQ feedback method according to an exemplary embodiment of the present application.

FIG. 4 is a flowchart showing another HARQ feedback method according to an exemplary embodiment of the present application. As shown in FIG. 4, before step S101 is executed, the method may further include the following step.

In step S100, the binding rule is agreed with the data sender.

In addition, the data receiver may also determine the binding rule in other manners. For example, when the data receiver is a base station and the data sender is UE, the data receiver may configure the binding rule and send the binding rule to the data sender. When the data receiver is UE and the data sender is a base station, the data receiver may receive the binding rule from the data sender.

The data receiver may send the binding rule to the data sender through control signaling. The control signaling may include broadcast signaling, RRC upper-layer signaling, MAC-layer signaling or physical-layer signaling.

According to the embodiments, the binding rule may be agreed with the data sender, so that a condition for subsequently grouping CCs according to the binding rule can be provided.

Figure 5:
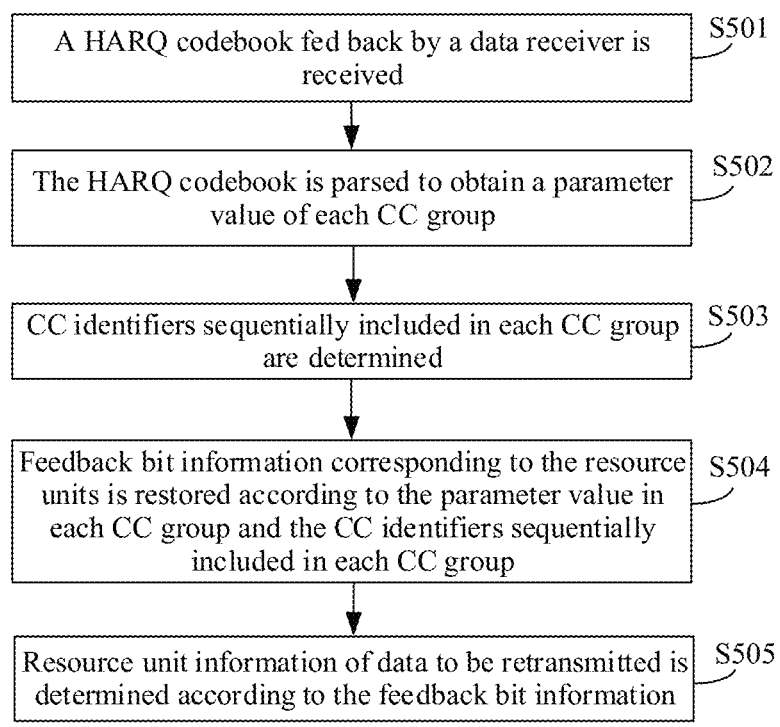
FIG. 5 is a flowchart showing a method for determining data to be retransmitted according to an exemplary embodiment of the present application.

FIG. 5 is a flowchart showing a method for determining data to be retransmitted according to an exemplary embodiment of the present application. The embodiment is described from the aspect of a data sender. The data sender may be UE or a base station. As shown in FIG. 5, the method for determining data to be retransmitted may include the following steps.

In step S501, a HARQ codebook fed back by a data receiver is received.

In step S502, the HARQ codebook is parsed to obtain a parameter value of each CC group, the parameter value being determined through calculation by the data receiver after CCs are grouped according to a binding rule and the binding rule including the number of resource units contained in a group of CCs that are allowable and capable for being bundled.

The resource units each may include, but not limited to, a CBG, and the parameter value may be a total DAI.

In step S503, CC identifiers sequentially included in each CC group are determined.

The CC identifiers sequentially included in each CC group may be determined in multiple manners. For example, the CC identifiers sequentially included in each CC group may be determined in the following two manners.

Manner 1): the CC identifiers sequentially included in each CC group are determined according to a manner, agreed with the data receiver, for determining the CC identifiers sequentially included in each CC group.

The data sender may agree with the data receiver that the CC identifiers sequentially included in each CC group are determined according to a data receiving sequence or in other manners.

Manner 2): the CC identifiers sequentially included in each CC group are received from the data receiver.

In step S504, feedback bit information corresponding to the resource units is restored according to the parameter value of each CC group and the CC identifiers sequentially included in each CC group.

In step S505, resource unit information of data to be retransmitted is determined according to the feedback bit information.

According to the embodiments, a HARQ codebook fed back by the data receiver may be received, the HARQ codebook may be parsed to obtain a parameter value of each CC group, CC identifiers sequentially included in each CC group may be determined, then feedback bit information corresponding to the resource units may be restored according to the parameter value of each CC group and the CC identifiers sequentially included in each CC group, and finally resource unit information of data to be retransmitted may be determined according to the feedback bit information. In the whole implementation process, the volume of feedback information is small.

Figure 6:
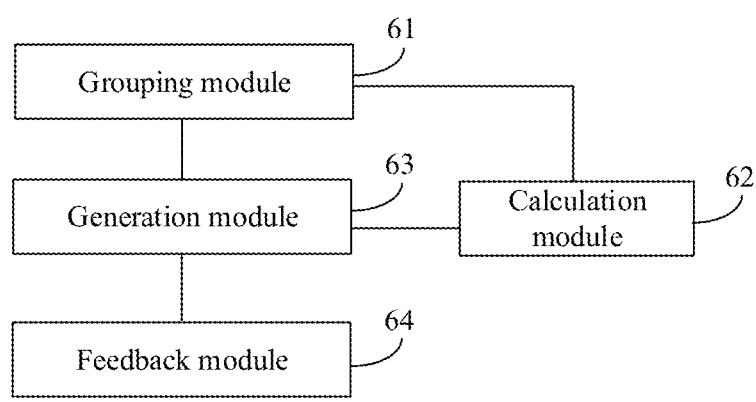
FIG. 6 is a block diagram of a HARQ feedback device according to an exemplary embodiment.

FIG. 6 is a block diagram of a HARQ feedback device according to an exemplary embodiment. The device may be applied to a data receiver. As shown in FIG. 6, the device includes a grouping module 61, a calculation module 62, a generation module 63 and a feedback module 64.

The grouping module 61 is configured to group CCs according to a binding rule, the binding rule including the number of resource units contained in a group of CCs that are allowable and capable for being bundled.

The resource units each may include, but not limited to, a CBG. The grouping module 61 may be configured to hierarchically group the CCs according to the binding rule, the binding rule including a range of the number of resource units contained the hierarchically grouped CCs. For example, a range of amount of resource units, such as a range of amount of CBGs, in a first-level CC group is 1 to 2, and a range of amount of resource units, such as a range of amount of CBGs, in a second-level CC group is 3 to 4.

A CC grouping process will be described below with 8 CCs as an example. CC0 may include 4 CBGs, CC1 may include 2 CBGs, CC2 may include 1 CBG, CC3 may include 2 CBGs, CC4 may include 3 CBGs, CC5 may include 3 CBGs, CC6 may include 2 CBGs and CC7 may include 3 CBGs, as shown in FIG. 2. In FIG. 2, the grey block represents a slot where data is transmitted. If the binding rule may include that the range of the amount of the CBGs in the first-level CC group is 1 to 2 and the range of the amount of the CBGs in the second-level CC group is 3 to 4, the hierarchically grouped CCs are the ones as shown in FIG. 3.

The calculation module 62 is configured to calculate a parameter value of each CC group after the grouping module 61 groups the CCs.

The parameter value may be a total DAI. For example, a total DAI of a first CC group (or the first-level CC group) in FIG. 3 is calculated to be 7, and a total DAI of a second CC group (or the second-level CC group) in FIG. 3 is calculated to be 6.

The generation module 63 is configured to generate the same number of HARQ codebooks as that of CC groups after the grouping module 61 groups the CCs, a length of one of the HARQ codebooks being determined respectively by the parameter value of each corresponding CC group and the maximum number of resource units in a single CC in the each corresponding CC group.

For example, as shown in FIG. 3, two HARQ codebooks may be generated, a length of the first codebook may be 7*2=14 bit, and a length of the second codebook may be 6*4=24 bit.

The feedback module 64 is configured to feed back the HARQ codebooks generated by the generation module 63 to a data sender.

In the embodiment, the data receiver may combine multiple generated codebooks for feedback to the data sender.

According to the embodiments, CCs may be grouped according to a binding rule, a parameter value of each CC group may be calculated, the HARQ codebooks which is of the amount the same as the CC groups may be generated, and then the HARQ codebooks may be fed back to the data sender, so that the volume of feedback information is optimized, and the volume of the feedback information is further reduced.

Figure 7:
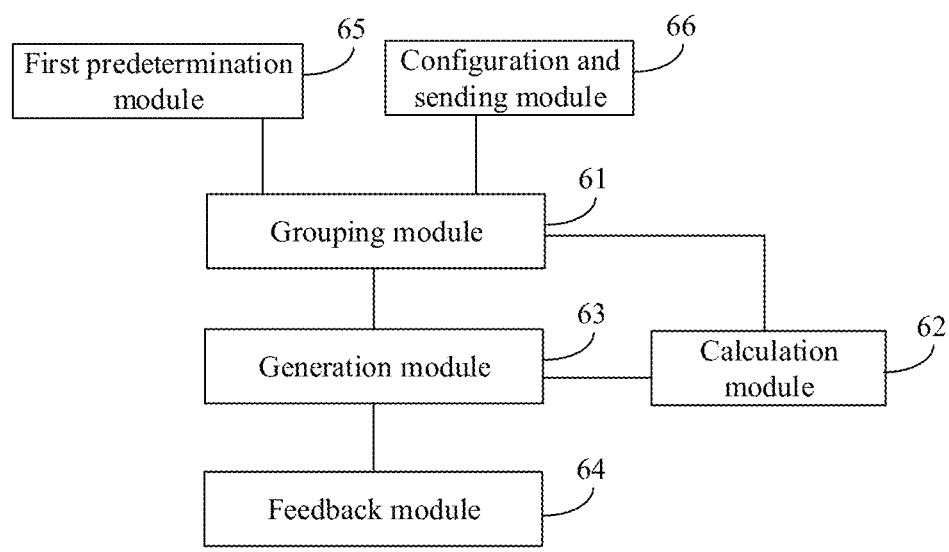
FIG. 7 is a block diagram of another HARQ feedback device according to an exemplary embodiment.

FIG. 7 is a block diagram of another HARQ feedback device according to an exemplary embodiment. As shown in FIG. 7, based on the embodiment shown in FIG. 6, when the data receiver is a base station and the data sender is UE, the device may further include a first predetermination module 65 or a configuration and sending module 66.

The first predetermination module 65 is configured to, before the grouping module 61 groups the CCs according to the binding rule, agree the binding rule with the data sender.

The configuration and sending module 66 is configured to, before the grouping module 61 groups the CCs according to the binding rule, configure the binding rule and send the binding rule to the data sender.

The configuration and sending module 66 may send the binding rule to the data sender through control signaling. The control signaling may include broadcast signaling, RRC upper-layer signaling, MAC-layer signaling or physical-layer signaling.

According to the embodiments, the binding rule may be agreed with the data sender or the configured binding rule may be sent to the data sender, so that a condition can be provided for subsequently grouping the CCs according to the binding rule.

Figure 8:
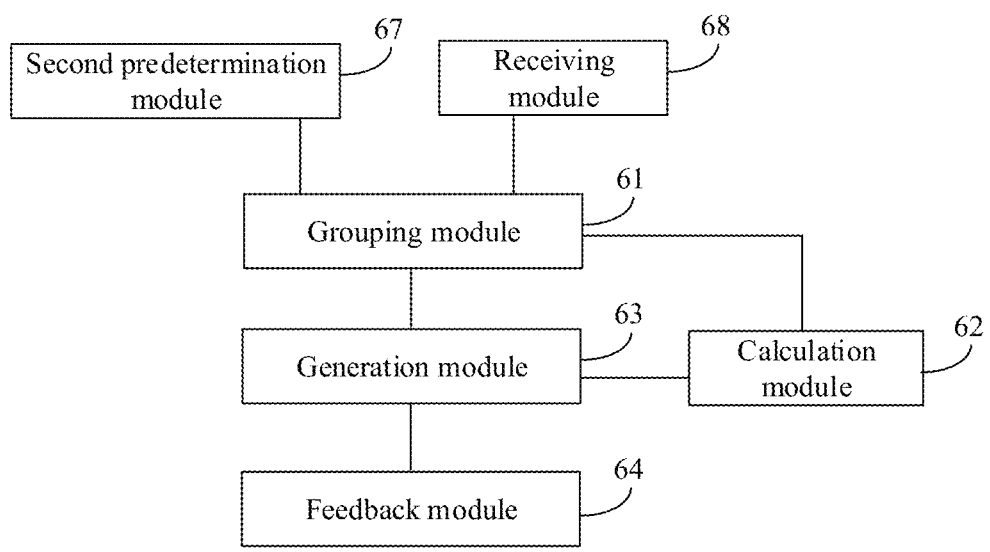
FIG. 8 is a block diagram of another HARQ feedback device according to an exemplary embodiment.

FIG. 8 is a block diagram of another HARQ feedback device according to an exemplary embodiment. As shown in FIG. 8, based on the embodiment shown in FIG. 6, when the data receiver is UE and the data sender is a base station, the device may further include a second predetermination module 67 or a receiving module 68.

The second predetermination module 67 is configured to, before the grouping module 61 groups the CCs according to the binding rule, agree the binding rule with the data sender.

The receiving module 68 is configured to, before the grouping module 61 groups the CCs according to the binding rule, receive the binding rule from the data sender.

According to the embodiments, the binding rule may be agreed with the data sender or the binding rule sent by the data sender may be received, so that a condition can be provided for subsequently grouping the CCs according to the binding rule.

Figure 9:
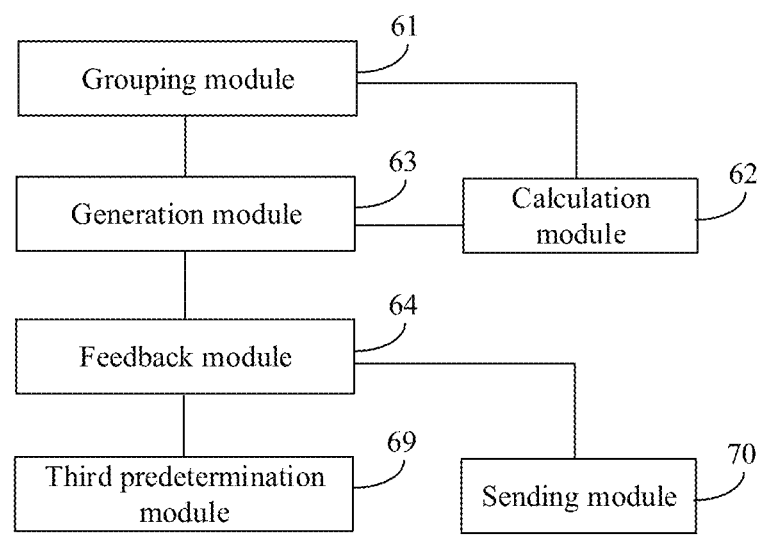
FIG. 9 is a block diagram of another HARQ feedback device according to an exemplary embodiment.

FIG. 9 is a block diagram of another HARQ feedback device according to an exemplary embodiment. As shown in FIG. 9, based on the embodiment shown in FIG. 6, the device may further include a third predetermination module 69 or a sending module 70.

The third predetermination module 69 is configured to agree, with the data sender, a manner for determining CC identifiers sequentially included in each CC group.

The sending module 70 is configured to send the CC identifiers sequentially included in each CC group to the data sender.

According to the embodiments, the manner for determining the CC identifiers sequentially included in each CC group may be agreed with the data sender, or the CC identifiers sequentially included in each CC group may be sent to the data sender, so that a condition can be provided for the data sender to determine resource unit information of data to be retransmitted.

Figure 10:
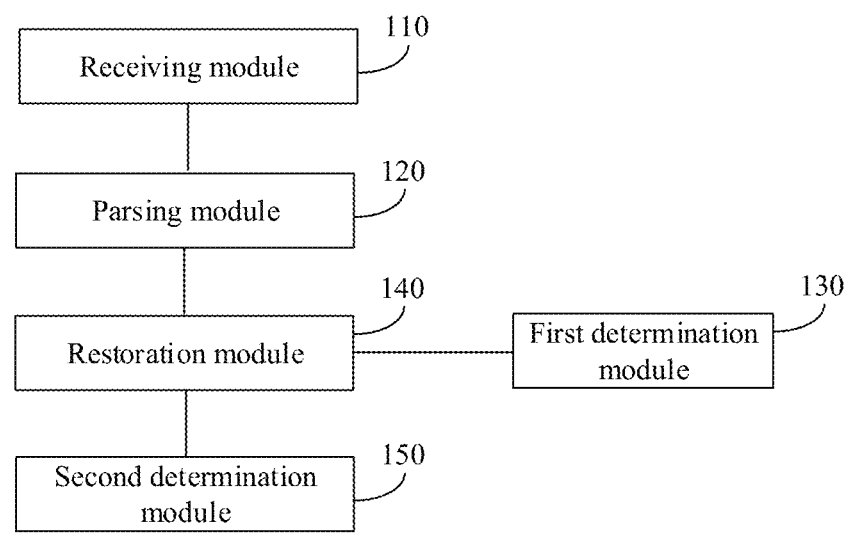
FIG. 10 is a block diagram of a device for determining data to be retransmitted according to an exemplary embodiment.

FIG. 10 is a block diagram of a device for determining data to be retransmitted according to an exemplary embodiment. The device may be applied to a data sender. As shown in FIG. 10, the device includes a receiving module 110, a parsing module 120, a first determination module 130, a restoration module 140 and a second determination module 150.

The receiving module 110 is configured to receive a HARQ codebook fed back by a data receiver.

The parsing module 120 is configured to parse the HARQ codebook received by the receiving module 110 to obtain a parameter value of each CC group. The parameter value may be determined through calculation by the data receiver after CCs are grouped according to a binding rule, and the binding rule may include the number of resource units contained in a group of CCs that are allowable and capable for being bundled.

The resource units each may include, but not limited to, a CBG, and the parameter value may be a total DAI.

The first determination module 130 is configured to determine CC identifiers sequentially included in each CC group.

The restoration module 140 is configured to restore feedback bit information corresponding to the resource units according to the parameter value, obtained by parsing of the parsing module 120, in each CC group and the CC identifiers, determined by the first determination module 130, sequentially included in each CC group.

The second determination module 150 is configured to determine resource unit information of data to be retransmitted according to the feedback bit information restored by the restoration module 140.

According to the embodiments, a HARQ codebook fed back by the data receiver may be received, the HARQ codebook may be parsed to obtain a parameter value of each CC group, CC identifiers sequentially included in each CC group may be determined, then feedback bit information corresponding to the resource units may be restored according to the parameter value of each CC group and the CC identifiers sequentially included in each CC group, and finally resource unit information of data to be retransmitted may be determined according to the feedback bit information. In the whole implementation process, the volume of feedback information can be small.

Figure 11:
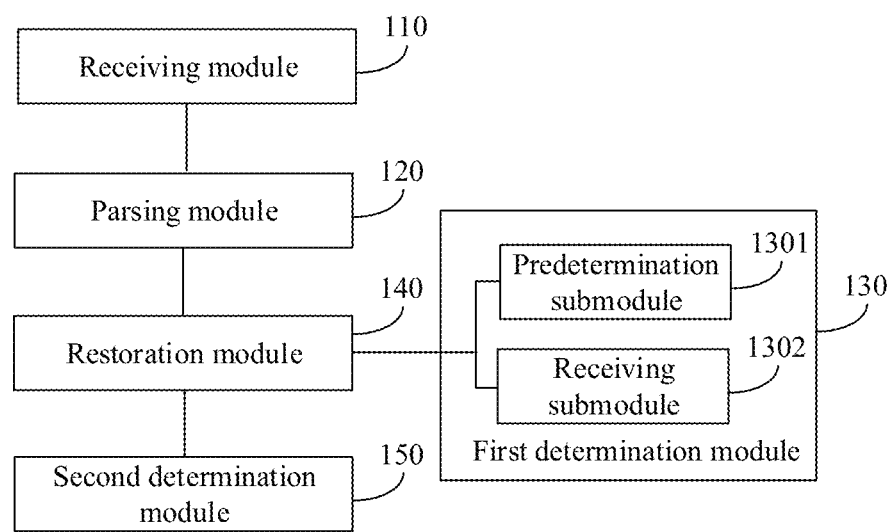
FIG. 11 is a block diagram of another device for determining data to be retransmitted according to an exemplary embodiment.

FIG. 11 is a block diagram of another device for determining data to be retransmitted according to an exemplary embodiment. As shown in FIG. 11, based on the embodiment shown in FIG. 10, the first determination module 130 may include a predetermination submodule 1301 or a receiving submodule 1302.

The predetermination submodule 1301 is configured to determine the CC identifiers sequentially included in each CC group according to a manner, agreed with the data receiver, for determining the CC identifiers sequentially included in each CC group.

The data sender may agree with the data receiver that the CC identifiers sequentially included in each CC group are determined according to a data receiving sequence or other manners.

The receiving submodule 1302 is configured to receive, from the data receiver, the CC identifiers sequentially included in each CC group.

According to the embodiments, the CC identifiers sequentially included in each CC group may be determined in multiple manners, so that a condition can be provided for determining the resource unit information of data to be retransmitted.

Figure 12:
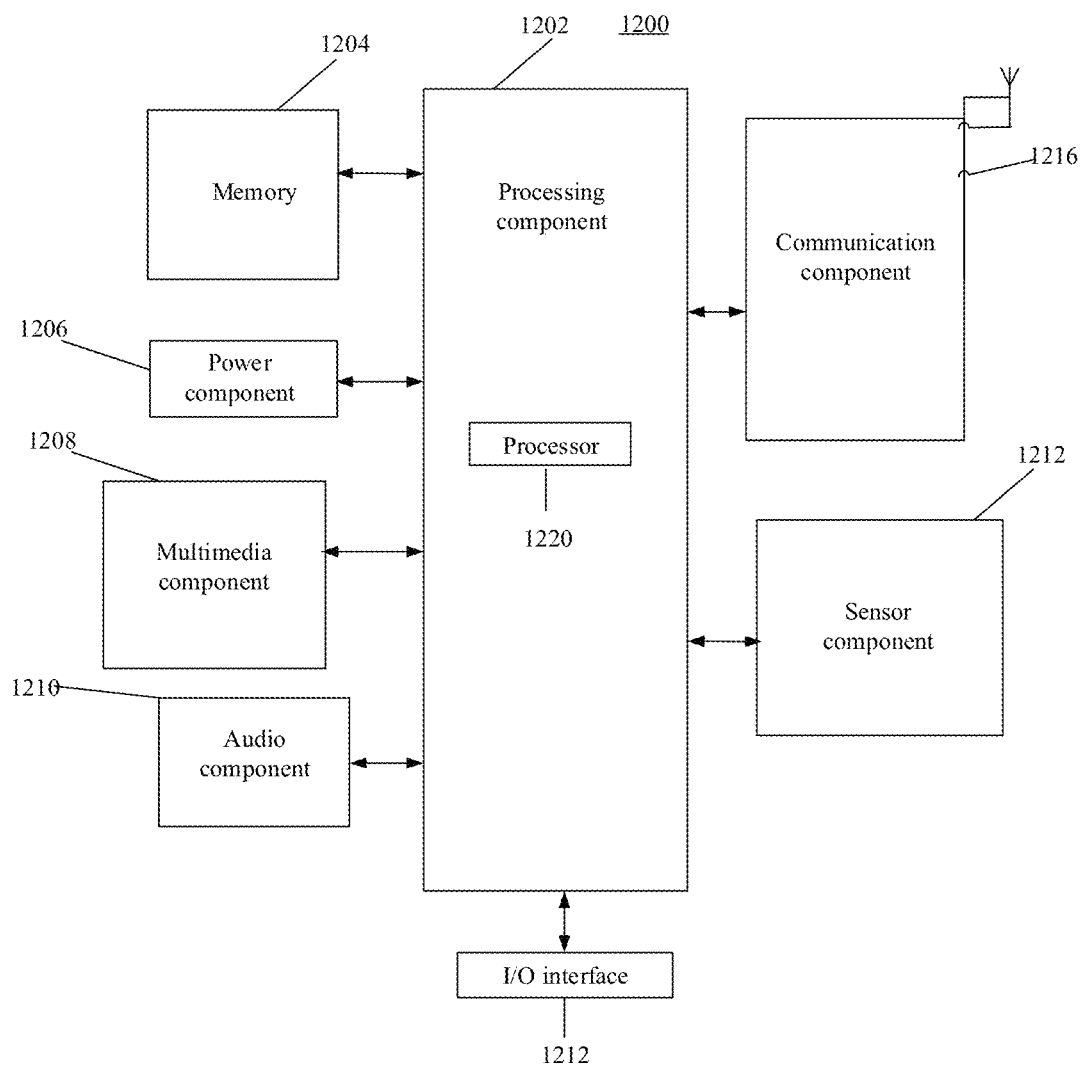
FIG. 12 is a block diagram of an apparatus applicable to a HARQ feedback device or a device for determining data to be retransmitted according to an exemplary embodiment.

FIG. 12 is a block diagram of an apparatus applicable to a HARQ feedback device or a device for determining data to be retransmitted according to an exemplary embodiment. For example, the apparatus 1200 may be UE such as a mobile phone, a computer, a digital broadcast terminal, a messaging device, a gaming console, a tablet, a medical device, exercise equipment and a personal digital assistant.

Referring to FIG. 12, the apparatus 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 is typically configured to control overall operations of the apparatus 1200, such as the operations associated with display, telephone calls, data communications, camera operations, and recording operations. The processing component 1202 may include one or more processors 1220 to execute instructions to perform all or part of the steps in the abovementioned method. Moreover, the processing component 1202 may include one or more modules which facilitate interaction between the processing component 1202 and the other components. For instance, the processing component 1202 may include a multimedia module to facilitate interaction between the multimedia component 1208 and the processing component 1202.

When the apparatus 1200 is applicable to the HARQ feedback device, one processor 1220 in the processing component 1202 may be configured to:

group CCs according to a binding rule, the binding rule including the number of resource units in CCs that can be bundled into a group;

calculate a parameter value of each CC group;

generate the same number of HARQ codebooks as that of CC groups, a length of one of the HARQ codebooks being determined respectively by the parameter value of each corresponding CC group and the maximum number of resource units in a single CC in the each corresponding CC group; and feed back the HARQ codebooks to a data sender.

When the apparatus 1200 is applicable to the device for determining data to be retransmitted, one processor 1220 in the processing component 1202 may be configured to:

receive a HARQ codebook fed back by a data receiver;

parse the HARQ codebook to obtain a parameter value of each CC group, the parameter value being determined through calculation by the data receiver after CCs are grouped according to a binding rule and the binding rule including the number of resource units in CCs that can be bundled into a group;

determine CC identifiers sequentially included in each CC group;

restore feedback bit information corresponding to the resource units according to the parameter value of each CC group and the CC identifiers sequentially included in each CC group; and determine resource unit information of data to be retransmitted according to the feedback bit information.

The memory 1204 is configured to store various types of data to support the operation of the apparatus 1200. Examples of such data may include instructions for any applications or methods operated on the apparatus 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 is configured to provide power for various components of the apparatus 1200. The power component 1206 may include a power management system, one or more power supplies, and other components associated with generation, management and distribution of power for the apparatus 1200.

The multimedia component 1208 may include a screen providing an output interface between the apparatus 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the apparatus 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the apparatus 1200 is in the operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 is configured to provide an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 may include one or more sensors configured to provide status assessment in various aspects for the apparatus 1200. For instance, the sensor component 1214 may detect an on/off status of the apparatus 1200 and relative positioning of components, such as a display and small keyboard of the apparatus 1200, and the sensor component 1214 may further detect a change in a position of the apparatus 1200 or a component of the apparatus 1200, presence or absence of contact between the user and the apparatus 1200, orientation or acceleration/deceleration of the apparatus 1200 and a change in temperature of the apparatus 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the apparatus 1200 and another apparatus. The apparatus 1200 may access a communication-standard-based wireless network, such as a Wireless Fidelity (WiFi) network, a 2nd-Generation (2G) or 3rd-Generation (3G) network or a combination thereof. In an exemplary embodiment, the communication component 1216 receives a broadcast signal or broadcast associated information from an external broadcast management system through a broadcast channel. In an exemplary embodiment, the communication component 1216 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the apparatus 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 1204 including instructions, and the instructions may be executed by the processor 1220 of the apparatus 1200 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 13:
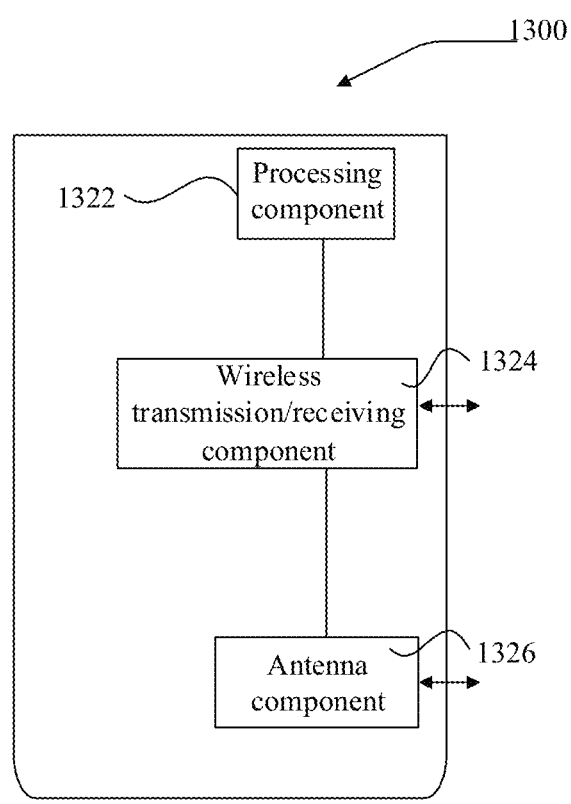
FIG. 13 is a block diagram of an apparatus applicable to a device for determining data to be retransmitted or a HARQ feedback device according to an exemplary embodiment.

FIG. 13 is a block diagram of an apparatus applicable to a device for determining data to be retransmitted or a HARQ feedback device according to an exemplary embodiment. The apparatus 1300 may be provided as a base station. Referring to FIG. 13, the apparatus 1300 includes a processing component 1322, a wireless transmission/receiving component 1324, an antenna component 1326 and a wireless interface-specific signal processing part, and the processing component 1322 may further include one or more processors.

When the apparatus 1300 is applicable to the HARQ feedback device, one processor in the processing component 1322 may be configured to:

group CCs according to a binding rule, the binding rule including the number of resource units in the CCs that can be bundled into a group;

calculate a parameter value of each CC group;

generate the same number of HARQ codebooks as that of CC groups, a length of one of the HARQ codebooks being determined by the parameter value of the corresponding CC group and the maximum number of resource units in a single CC in the corresponding CC group; and feed back the HARQ codebooks to a data sender.

When the apparatus 1300 is applicable to the device for determining data to be retransmitted, one processor in the processing component 1322 may be configured to:

receive a HARQ codebook fed back by a data receiver;

parse the HARQ codebook to obtain a parameter value of each CC group, the parameter value being determined through calculation by the data receiver after CCs are grouped according to a binding rule and the binding rule including the number of resource units in the CCs that can be bundled into a group;

determine CC identifiers sequentially included in each CC group;

restore feedback bit information corresponding to the resource units according to the parameter value of each CC group and the CC identifiers sequentially included in each CC group; and determine resource unit information of data to be retransmitted according to the feedback bit information.

In an exemplary embodiment, there is also provided a non-transitory computer-readable storage medium including instructions, and the instructions may be executed by the processing component 1322 of the apparatus 1300 to implement the HARQ feedback method or the method for determining data to be retransmitted. For example, the non-transitory computer-readable storage medium may be a ROM, a RAM, a CD-ROM, a magnetic tape, a floppy disc, an optical data storage device and the like.

The apparatus embodiments substantially correspond to the method embodiments, and thus related parts refer to part of descriptions of the method embodiments. The apparatus embodiment described above is only schematic. The units described as separate parts therein may or may not be physically separated. The parts displayed as units may or may not be physical units, namely, may be located in the same place or may be distributed to multiple network units. Part or all of the modules therein may be selected according to a practical requirement to achieve the purpose of the solutions of the embodiments. Those of ordinary skill in the art may understand and implement without creative work.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

It is to be noted that relational terminologies "first", "second" and the like in the present disclosure are adopted only to distinguish one entity or operation from another entity or operation and not always to require or imply existence of any such practical relationship or sequence between the entities or operations. Terminologies "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof.

What is claimed is:

1. A hybrid automatic repeat request (HARQ) feedback method, applied to a data receiver, the method comprising:
grouping component carriers (CCs) according to a binding rule, wherein the binding rule comprises a number of resource units comprised in a group of CCs and the group of CCs are capable for being bundled;
calculating a parameter value of each CC group;
generating the same number of HARQ codebooks as that of CC groups, wherein a length of one of the HARQ codebooks is determined by the parameter value of a corresponding CC group and a maximum number of resource units comprised in a single CC in the corresponding CC group; and
feeding back the HARQ codebooks to a data sender,
wherein grouping the CCs according to the binding rule comprises:
hierarchically grouping the CCs according to the binding rule, wherein the binding rule comprises a consecutive range of the number of resource units comprised in the hierarchically grouped CCs; and
wherein the method further comprises:
agreeing, with the data sender, a manner for determining CC identifiers sequentially comprised in each CC group; or
sending CC identifiers sequentially comprised in each CC group to the data sender.

2. The HARQ feedback method of claim 1, wherein the data receiver is a base station and the data sender is user equipment (UE), and the HARQ feedback method further comprises:
before grouping the CCs according to the binding rule, agreeing the binding rule with the data sender; or
before grouping the CCs according to the binding rule, configuring the binding rule and sending the binding rule to the data sender.

3. The HARQ feedback method of claim 2, wherein sending the binding rule to the data sender comprises:
sending the binding rule to the data sender through control signaling,
wherein the control signaling comprises broadcast signaling, radio resource control (RRC) upper-layer signaling, media access control (MAC)-layer signaling or physical-layer signaling.

4. The HARQ feedback method of claim 1, wherein the data receiver is UE and the data sender is a base station, the HARQ feedback method further comprises:
before grouping the CCs according to the binding rule, agreeing the binding rule with the data sender; or
before grouping the CCs according to the binding rule, receiving the binding rule from the data sender.

5. The HARQ feedback method of claim 1, wherein the resource units are code block groups (CBGs), and the parameter value is a total downlink assignment index (DAI).

6. A method for determining data to be retransmitted, applied to a data sender, the method comprising:
receiving a hybrid automatic repeat request (HARQ) codebook fed back by a data receiver;
parsing the HARQ codebook to obtain a parameter value of each component carrier (CC) group, wherein the parameter value is determined through calculation by the data receiver after CCs are grouped according to a binding rule and the binding rule comprises a number of resource units comprised in a group of CCs and the group of CCs are capable for being bundled;
determining CC identifiers sequentially comprised in each CC group;
restoring feedback bit information corresponding to the resource units, according to the parameter value of each CC group and the CC identifiers sequentially comprised in each CC group; and
determining resource unit information of data to be retransmitted according to the feedback bit information,
wherein the binding rule comprises a consecutive range of the number of resource units contained in hierarchically grouped CCs in each CC group; and
wherein determining the CC identifiers sequentially comprised in each CC group comprises:
determining the CC identifiers sequentially comprised in each CC group according to a manner, agreed with the data receiver, for determining the CC identifiers sequentially comprised in each CC group; or
receiving the CC identifiers sequentially comprised in each CC group from the data receiver.

7. The method of claim 6, wherein the resource units are code block groups (CBG), and the parameter value is a total downlink assignment index (DAI).

8. A hybrid automatic repeat request (HARQ) feedback device, applied to a data receiver, comprising:
a processor; and
a memory configured to store instructions executable by the processor, and wherein the processor is configured to:
group component carriers (CCs) according to a binding rule, wherein the binding rule comprises a number of resource units comprised in a group of CCs and the group of CCs are capable for being bundled;
calculate a parameter value of each CC group after the CCs are grouped;
generate the same number of HARQ codebooks as that of CC groups after the CCs are grouped, wherein a length of one of the HARQ codebooks is determined-by the parameter value of a corresponding CC group and a maximum number of resource units-comprised in a single CC in the corresponding CC group; and
feed back the HARQ codebooks generated to a data sender,
wherein the processor is further configured to:
hierarchically group the CCs according to the binding rule, wherein the binding rule comprises a consecutive range of the number of resource units comprised the hierarchically grouped CCs; and
wherein the processor is further configured to:
agree, with the data sender, a manner for determining CC identifiers sequentially comprised in each CC group; or
send CC identifiers sequentially comprised in each CC group to the data sender.

9. The HARQ feedback device of claim 8, wherein the data receiver is a base station and the data sender is user equipment (UE), and the processor is further configured to:
before the grouping module groups the CCs are grouped according to the binding rule, agree the binding rule with the data sender; or before the CCs are grouped according to the binding rule, configure the binding rule and send the binding rule to the data sender.

10. The HARQ feedback device of claim 9, wherein the processor is further configured to:
send the binding rule to the data sender through control signaling, and
wherein the control signaling comprises broadcast signaling, radio resource control (RRC) upper-layer signaling, media access control (MAC)-layer signaling or physical-layer signaling.

11. The HARQ feedback device of claim 8, wherein the data receiver is UE and the data sender is a base station, and the processor is further configured to:
before the CCs are grouped according to the binding rule, agree the binding rule with the data sender; or
before the grouping module groups the CCs are grouped according to the binding rule, receive the binding rule from the data sender.

12. The HARQ feedback device of claim 8, wherein the resource units are code block groups (CBGs), and the parameter value is a total downlink assignment index (DAI).

13. A device for determining data to be retransmitted, applied to a data sender, comprising:
a processor; and
a memory configured to store instructions executable by the processor, and
wherein the processor is configured to:
receive a hybrid automatic repeat request (HARQ) codebook fed back by a data receiver;
parse the HARQ codebook received to obtain a parameter value of each component carrier (CC) group, wherein the parameter value is determined through calculation by the data receiver after CCs are grouped according to a binding rule and the binding rule comprises the number of resource units comprised in a group of CCs and the group of CCs are capable for being bundled;
determine CC identifiers sequentially comprised in each CC group;
restore feedback bit information corresponding to the resource units according to the parameter value in each CC group and the CC identifiers, wherein the parameter value is obtained by parsing and the CC identifiers are determined sequentially comprised in each CC group; and
determine resource unit information of data to be retransmitted according to the feedback bit information restored,
wherein the binding rule comprises a consecutive range of the number of resource units contained in hierarchically grouped CCs in each CC group; and
wherein the processor is further configured to:
determine the CC identifiers sequentially comprised in each CC group according to a manner, agreed with the data receiver, for determining the CC identifiers sequentially comprised in each CC group; or
receive the CC identifiers sequentially comprised in each CC group from the data receiver.

14. The device of claim 13, wherein the resource units are code block groups (CBGs), and the parameter value is a total downlink assignment index (DAI).

* * * * *